United States Patent
Thornberg et al.

(10) Patent No.: US 8,955,370 B1
(45) Date of Patent: Feb. 17, 2015

(54) DETECTION OF GAS LEAKAGE

(75) Inventors: Steven M. Thornberg, Mesa, CO (US); Jason Brown, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 409 days.

(21) Appl. No.: 13/473,063

(22) Filed: May 16, 2012

Related U.S. Application Data

(63) Continuation-in-part of application No. 12/424,791, filed on Apr. 16, 2009, now Pat. No. 8,201,438.

(60) Provisional application No. 61/046,174, filed on Apr. 18, 2008.

(51) Int. Cl.
G01M 3/32 (2006.01)

(52) U.S. Cl.
USPC .......................................................... 73/49.3

(58) Field of Classification Search
CPC .................................. G01M 3/04; G01M 3/26
USPC .................................................. 73/49.2, 49.3
See application file for complete search history.

(56) References Cited

U.S. PATENT DOCUMENTS

| | | | | |
|---|---|---|---|---|
| 4,157,656 A | * | 6/1979 | Walle | 73/49.2 |
| 4,294,107 A | * | 10/1981 | Walle | 73/49.2 |
| 5,081,864 A | * | 1/1992 | Zaim | 73/49.2 |
| 5,261,268 A | | 11/1993 | Namba | |
| 5,412,978 A | * | 5/1995 | Boone et al. | 73/49.2 |
| 5,600,996 A | * | 2/1997 | Witschi | 73/49.2 |
| 5,628,985 A | | 5/1997 | Stiller et al. | |
| 6,196,056 B1 | * | 3/2001 | Ewing et al. | 73/40.7 |
| 6,286,362 B1 | * | 9/2001 | Coffman et al. | 73/40.7 |
| 6,840,089 B2 | * | 1/2005 | Docy et al. | 73/49.7 |
| 7,168,297 B2 | | 1/2007 | Herzog et al. | |
| 7,454,957 B2 | | 11/2008 | Lehmann | |
| 7,500,381 B2 | | 3/2009 | Palenstyn et al. | |
| 2005/0126265 A1 | * | 6/2005 | Herzog et al. | 73/49.2 |
| 2009/0136361 A1 | | 5/2009 | Greven et al. | |

OTHER PUBLICATIONS

S.M. Thornberg and J. Brown, Description of the Power-Free Pump Module, Presented at the GT-IMOG Conference, Amarillo, TX, May 2007.

* cited by examiner

*Primary Examiner* — Hezron E Williams
*Assistant Examiner* — Mark A Shabman
(74) *Attorney, Agent, or Firm* — Helen S. Baca

(57) ABSTRACT

A method of detecting leaks and measuring volumes as well as a device, the Power-free Pump Module (PPM), provides a self-contained leak test and volume measurement apparatus that requires no external sources of electrical power during leak testing or volume measurement. The PPM is a portable, pneumatically-controlled instrument capable of generating a vacuum, calibrating volumes, and performing quantitative leak tests on a closed test system or device, all without the use of alternating current (AC) power. Capabilities include the ability is to provide a modest vacuum (less than 10 Torr) using a venturi pump, perform a pressure rise leak test, measure the gas's absolute pressure, and perform volume measurements. All operations are performed through a simple rotary control valve which controls pneumatically-operated manifold valves.

18 Claims, 6 Drawing Sheets

DETECTION OF GAS LEAKAGE

CROSS-REFERENCE TO RELATED APPLICATIONS

This application is a continuation-in-part of U.S. application Ser. No. 12/424,791, filed Apr. 16, 2009 now U.S. Pat. No. 8,201,438, which claims the benefit of U.S. Provisional Application No. 61/046,174, filed Apr. 18, 2008, both of which are incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates generally to the detection of gas leakage and, more particularly, to a method and device for detecting gas leakage at low vacuum and without requiring an electrical power source.

BACKGROUND OF THE INVENTION

Leak test instruments have applications in industries including aerospace, automotive, refrigeration, defense, oil and gas, semiconductor, and renewable (for example, solar) energy. However, for many industrial applications performing gas sampling and leak test operations is becoming more and more difficult as safety requirements increase due to the reluctance of having powered (for example, AC power) testers in sensitive or hazardous applications. For example, in some static sensitive or hazardous (e.g., flammable, poisonous) applications and with the current safety rules, powered test equipment cannot be used when electrical discharges are possible (for example, when lightning storms are in the area or when electrical motors, such as vacuum pumps, are operated), which greatly reduces production throughput.

Typical leak test instruments are bulky and require AC power and gas cylinders (for example, helium). Further, none of existing instruments incorporate the on-board capability to measure volume, a necessary parameter for calculating and interpreting pressure rise leak rates. Additionally, most of these instruments require lengthy warm-up times. Therefore, a need remains for a leak test instrument that is compact, has a short response time, is not electrically powered, and can be used in sensitive or hazardous applications.

SUMMARY OF THE INVENTION

The present invention is directed to a device for detection of gas leakage, comprising a compressed gas source; a venturi vacuum pump; a vacuum manifold fluidically connected separately to the compressed gas source, the venturi vacuum pump, and a device under test; a control valve for controlling fluid flow through the manifold from the device under test to either the compressed gas source or the venturi vacuum pump; and a differential pressure gauge for measuring the pressure differential between the manifold and the device under test as a function of time. The absolute pressure can be measured by an absolute pressure gauge fluidically connected to the manifold which can also be used to calculate an absolute leak rate of the device under test. The device can further comprise a standard container with a known volume fluidically connected to the manifold. Typically, the venturi vacuum pump can evacuate the manifold to an absolute pressure of less than approximately 10 Torr and greater than approximately 1 Torr. The control valve can comprise a multi-port pneumatic valve. The separate fluidic connections can each comprise a pneumatic valve controlled by the multi-port pneumatic control valve. The compressed gas source can comprise compressed air. The pressure gauges can comprise digital gauges powered by a non-alternating-current power source, or can comprise non-powered analog gauges.

The invention is further directed to a method for detection of gas leakage using the device for detection of gas leakage, comprising connecting the venturi vacuum pump to the device under test through the manifold with the control valve, thereby evacuating the device under test and the manifold to a low vacuum; disconnecting the venturi vacuum pump from the manifold; disconnecting the device under test from the manifold; and measuring the pressure differential between the manifold and the device under test with the differential pressure gauge as a function of time, thereby providing a pressure rise per unit time. An absolute leak can be determined from the pressure rise per unit time and the volume of the device under test. The device can further comprise determining the volume of the device under test using the known volume of the standard container. The method can further comprise at least one evacuate-backfill step, each evacuate-backfill step comprising connecting the manifold to the compressed gas source after the step of disconnecting the venturi vacuum pump from the manifold, thereby backfilling the manifold and the device under test with compressed gas from the compressed gas source; disconnecting the manifold from the compressed gas source; connecting the manifold to the venturi vacuum pump, thereby evacuating the device under test and the manifold to a low vacuum; and disconnecting the venturi vacuum pump from the manifold.

DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

The present invention is directed to both a method of detecting leaks and measuring volumes as well as a device for detection of gas leakage, referred to herein as the Power-free Pump Module (PPM). The PPM is a self-contained gas leak test and volume measurement device that requires no external sources of electrical power during leak testing or volume measurement. The PPM provides a portable, pneumatically-controlled instrument capable of generating a vacuum, calibrating volumes, and performing quantitative leak tests on a closed test system or device, all without the use of alternating current (AC) power. Testing can begin literally within seconds of instrument start-up, whereas typical leak detectors can take up to an hour to warm up and stabilize. Capabilities include the ability is to provide a modest vacuum (less than 10 Torr), perform a pressure rise leak test, measure the gas's absolute pressure, and perform volume measurements. All operations can be performed through a simple rotary control valve which controls pneumatically-operated manifold valves. This instrument addresses the technical problem of not being able to use conventional AC-powered testers in static-sensitive or hazardous applications.

Figure 1:
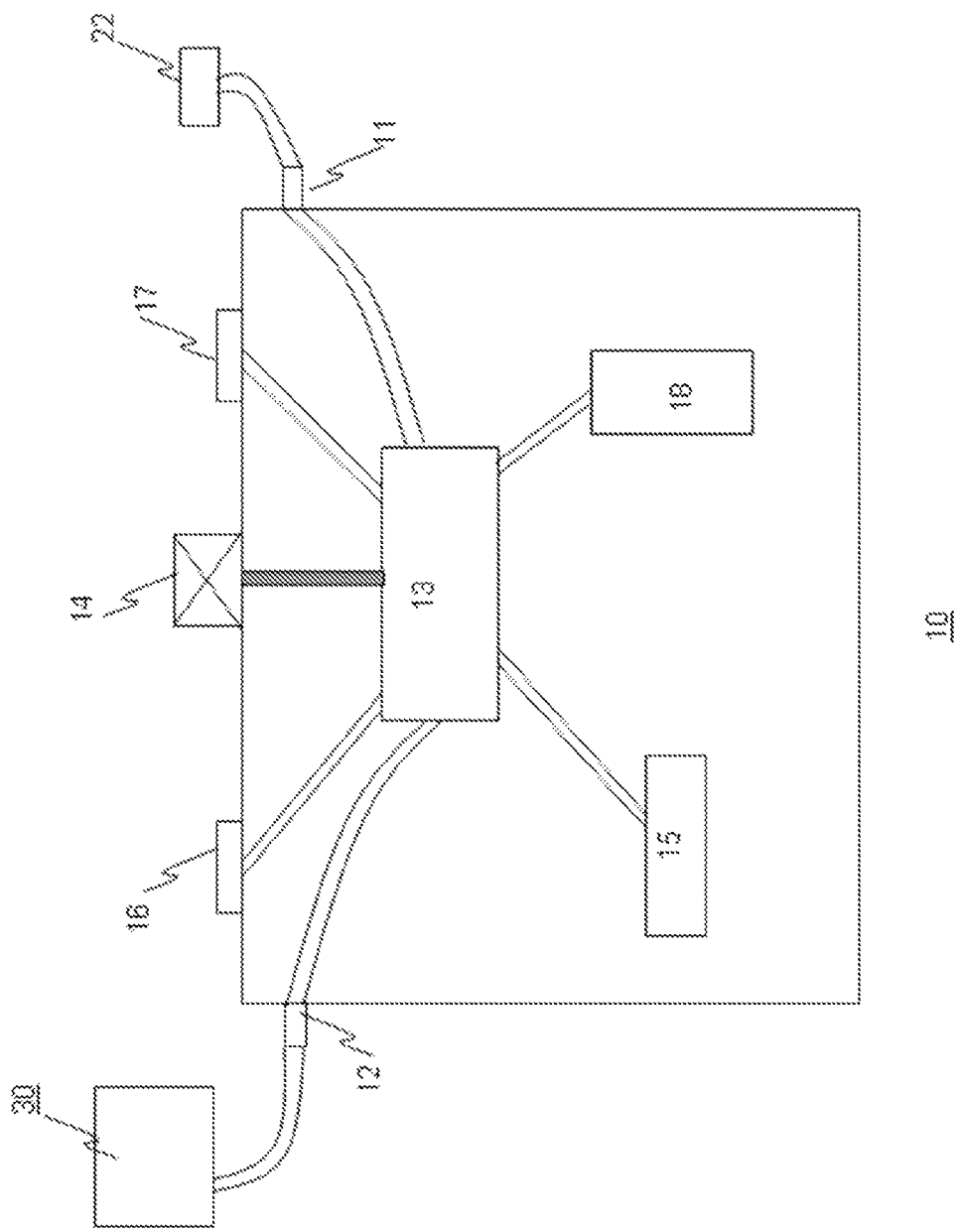
FIG. 1 is a schematic illustration of a device for detection of gas leakage according to the present invention.

As depicted in FIG. 1, the PPM can comprise a housing 10 that comprises a first port 11 that can be fluidically connected to a compressed gas source 22, either external or internal to the housing 10, and also fluidically connected to a manifold 13. The first port 11 comprises a means to control flow of the compressed gas, such as a simple ball valve or miniature pneumatic valve that can stop and start the flow of the compressed gas. For example, the compressed gas source can be readily available compressed air at a pressure of approximately 70-90 psig or can be any available compressed gas (e.g., nitrogen or argon) at pressures compatible with other elements in the PPM system. For example, the first port 11 can be connected to the compressed gas source 22 with a rubber hose. An in-line filter (not shown) can be provided to filter the compressed gas/air. The housing 10 also comprises a second port 12 that can be fluidically connected to a device under test 30 and also connected to the manifold 13. The manifold 13 can be simply a vacuum chamber having multiple apertures or ports for making fluidic connections wherein the connections can be controlled by a control valve 14 mounted on the housing 10. The manifold 13 is also fluidically connected through a valve to a vacuum pump 15 for creating a low vacuum, such as a venturi pump, hand-operated vacuum pump, or similar pump capable of providing a vacuum down to approximately 1-10 Torr pressure without electrical power. A venturi pump is a unique type of aspirating pump, or air ejector, that produces a vacuum by means of the Venturi effect. In an aspirator, the compressed gas flows through a tube which then narrows, causing the gas pressure to decrease because of the Venturi effect. A venturi pump is small and efficient, much better than the AC or battery-powered vacuum sources for reaching the low vacuum levels preferred for the present invention. Importantly, a venturi pump does not require a mechanical displacement or electrical power to operate. A venturi pump has no moving parts and is about the size of a deck of cards, making portability possible. In particular, a venturi pump can use the same "power"—which is actually the compressed gas/air—as the pneumatic valve operation. Therefore, a venturi pump enables an electric-power-free vacuum. The manifold 13 can be optionally connected to a standard container 18 with a known volume. Connected to the manifold 13 are two means for measuring pressures: an absolute pressure gauge 16 can measure the absolute pressure in the manifold 13 and a differential pressure gauge 17 can measure a pressure differential between the manifold 13 and the device under test 30 to a level dependent upon the application. For example, a pressure differential down to 0.001 Torr can be measured. Both the absolute and differential pressure gauges can require no power or can be digital devices that are powered by a low-power direct current (DC) voltage source, such as a dry cell battery. Connection lines (such as stainless steel tubing lines) can fluidically connect the manifold 13 to the ports 11 and 12, the pressure gauges 16 and 17, the control valve 14, the standard volume container 18 and the vacuum pump 15 and can preferably use pneumatic valves to control the flow. The control valve 14 can be a multi-port pneumatic valve to control other pneumatic valves that are on the manifold 13. The control valve 14 directs fluid flow through the manifold 13 by applying compressed gas to the active pneumatic valves and vent inactive valves. Importantly, the pneumatic valves are not electric nor electric triggered.

To determine gas leakage from a device under test, fluidic connections are made between the PPM and the device under test as well as between the PPM and the compressed gas source. A vacuum is established in both the device under test as well as within the manifold of the PPM by using the control valve to provide a fluidic connection between the vacuum pump and the device under test and to provide a fluidic connection between the vacuum pump and the manifold. Because the present invention measures the rate of leakage from the device under test using a pressure rise method, a vacuum level of >1 Torr is sufficient; a vacuum level of approximately 10 Torr is generally sufficient. However, the present invention can perform a rate of leakage measurement at other pressures (e.g., a pressure less than atmospheric pressure) provided a pressure gradient exists between the device under test and the manifold. According to the present invention, once the low vacuum conditions within the manifold and device under test have been established, the control valve is positioned to isolate the manifold from the vacuum pump and the device under test. If the device under test has gas leakage from any elements within the device under test or between the device under test and an external environment, such as the atmosphere, the pressure in the device under test will change. The differential pressure gauge can measure the differential pressure (e.g., pressure rise) between the evacuated manifold and the device under test as a function of time; this pressure change can be recorded manually or the differential pressure gauge can be electronically connected to a recording device such as a computer or other standard output device. The absolute leak rate can then be calculated from the pressure rise and the volume of the device under test according to:

$$Q = \frac{dn}{dt} = \frac{dP}{dt}\frac{V_{test}}{RT} = m\frac{V_{test}}{RT}$$

where R=6.236×10$^4$ Torr cc/K/mol, $V_{test}$ is the volume of the device under test, dP is the pressure rise per time interval dt, T is the absolute temperature, and Q is the flow (or leak) in mol/unit time (this equation neglects the volume of interconnecting tubing, etc., up to the shutoff valve that isolates the manifold from the device under test, which interconnecting volume must be compensated for in an actual leak rate measurement). By performing a units analysis, the necessary unit conversion factors can be added to provide the leak rate Q in atm cc/s. The rate of gas leakage from the device under test, if any, can thus be determined and compared to a pre-set level of acceptance. For example, leakage rates of approximately 5×10$^{-4}$ atm cm$^3$/s to approximately 1×10$^{-1}$ atm cm$^3$/s can be determined; however, this range can be adjusted to fit a particular application by changing the magnitude of the volumes involved, the ranges of the pressure gauges, and the time duration of the test.

Figure 2:
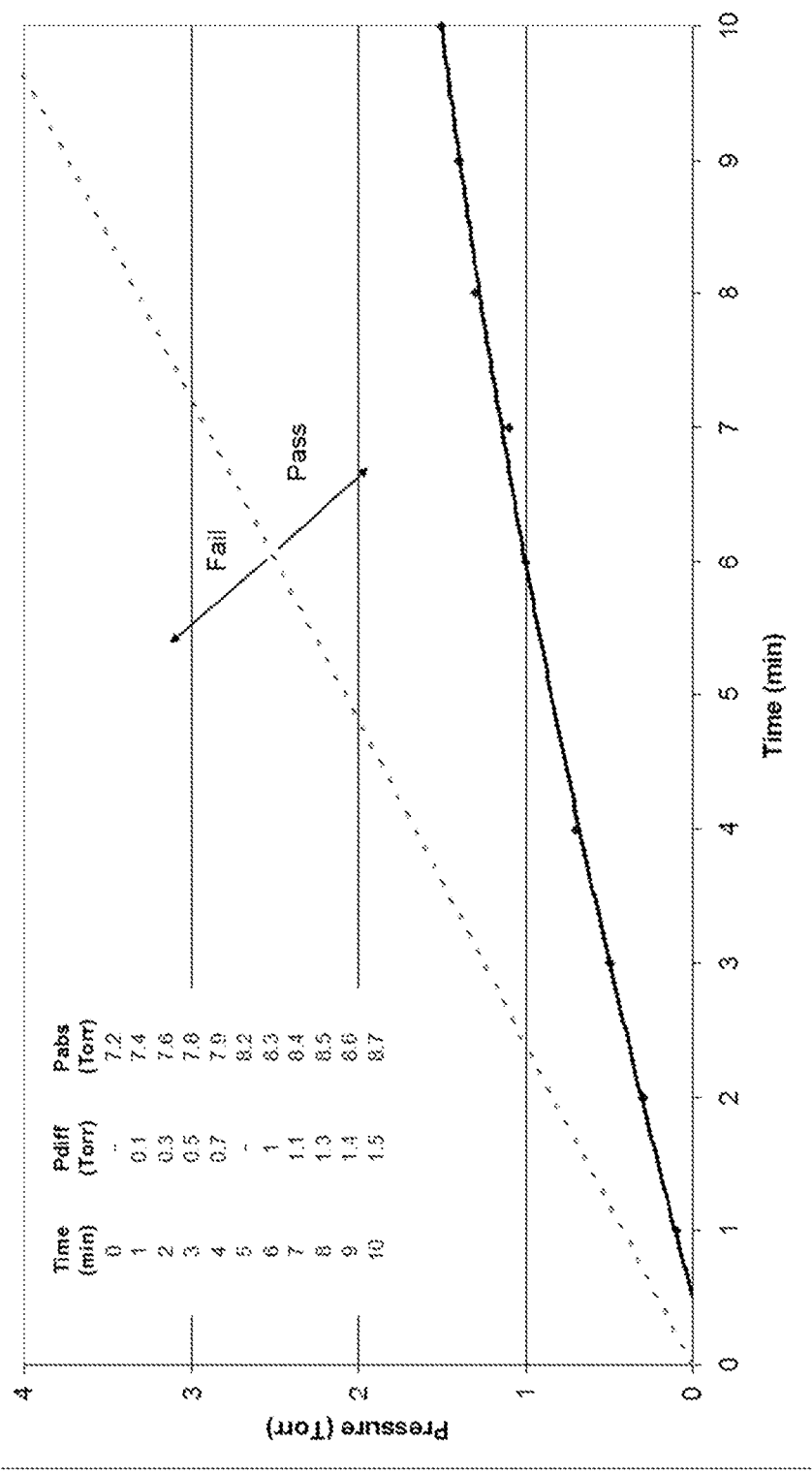
FIG. 2 is a graph of leak test data on a seal in a device under test.

FIG. 2 shows data from a leakage test performed to determine leakage from a window seal present in the device under test. The figure shows the pressure rise as a function of time, showing that leakage rates can be determined in several minutes. The pressure rise per unit time, dP/dt, is actually the slope of the line of pressure vs. time.

As described above, the volume of the device under test is important in some applications to help interpret the measured leakage rate. The volume of the device under test can be determined by first evacuating the standard volume container (for example, with a known volume of between 100 mL and 1000 mL) to a set vacuum pressure utilizing the connection to the vacuum pump; this base vacuum pressure can be recorded. The compressed gas is then directed by the control valve such that the manifold and device under test are vented to atmospheric pressure but the standard volume container remains under vacuum. The value for the atmospheric pressure is displayed by the absolute pressure gauge and recorded. The volume of the manifold system (manifold and associated connection lines and valves) can then be determined by first switching the control valve to establish a fluidic connection between the standard volume container and the manifold system (with the device under test isolated by a valve). The differential pressure is measured and the volume of the manifold system is calculated from the known atmospheric pressure, the known vacuum pressure, the differential pressure measured, and the known standard container volume (utilizing the known relationship that pressure, temperature, volume, and time is a constant in a closed system). To calculate the test device volume, the device under test is fluidically connected to the manifold system and the pressure differential is again measured. The volume of the device under test is calculated from the known vacuum pressure, the atmospheric pressure, the pressure after expansion and the known manifold system and standard container volumes, using the equation (assuming isothermal conditions; the effect of temperature can be included if necessary according to known relationships):

$$V_{test}=(P_{final}-P_{vacuum})V_{std}(P_{atm}-P_{final})-V_{manifold}$$

where
$V_{test}$ is the volume of the device under test;
$P_{final}$ is the final pressure in the device under test;
$P_{vacuum}$ is the established known vacuum pressure;
$V_{std}$ is volume of the standard volume container;
$P_{atm}$ is the pre-determined pressure (such as atmospheric); and
$V_{manifold}$ is the manifold volume.

Figure 3:
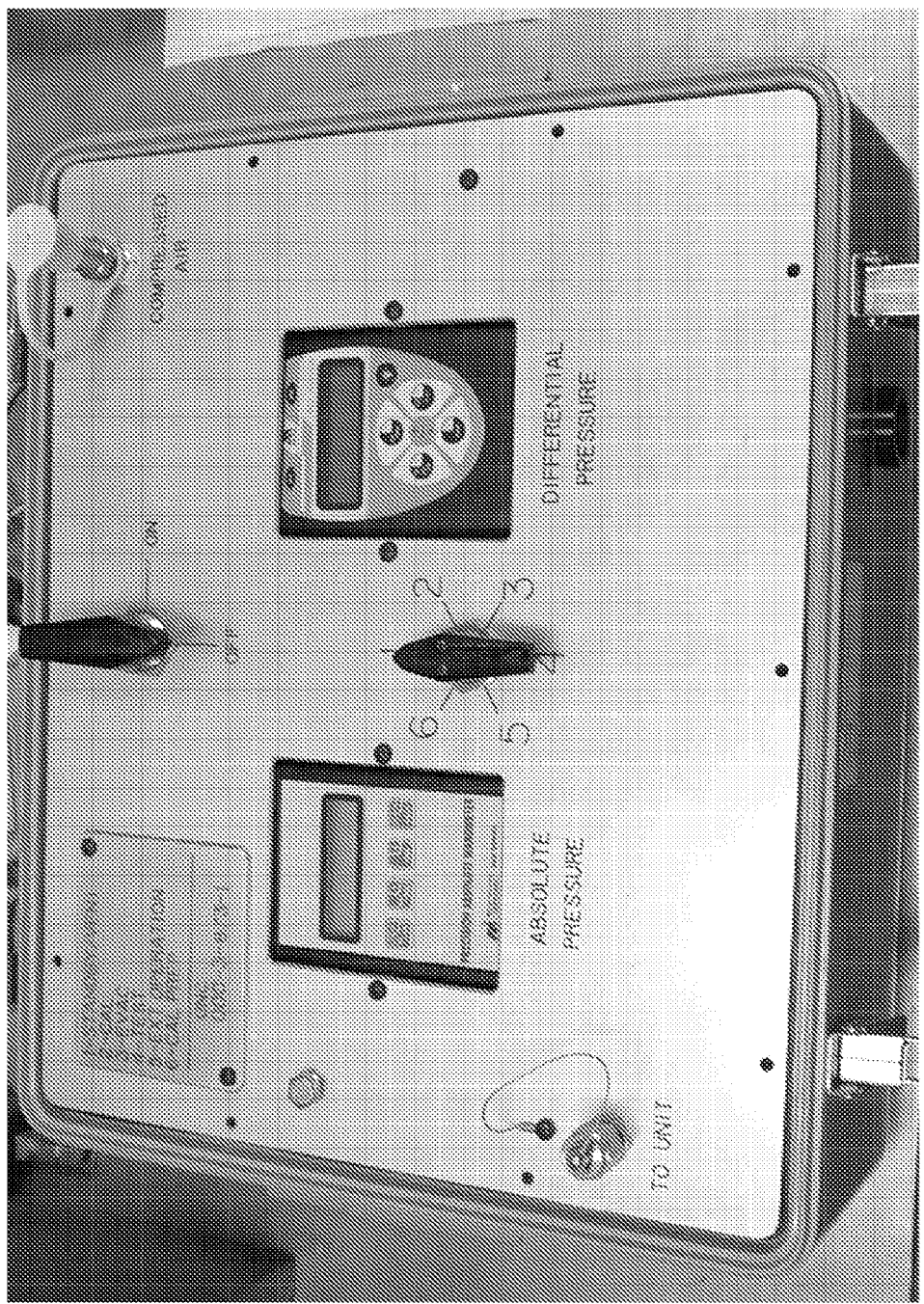
FIG. 3 is a photograph of the external housing of an embodiment of the present invention.

The non-AC-powered leak tester and volume calibration system is designed to be modular and easy-to-use. One embodiment of this invention is shown in the photograph of FIG. 3. This system consists of a front panel (standard rack mount), an absolute pressure gauge, a differential pressure gauge, a ball valve for turning the compressed air flow on and off, a control valve for directing the compressed air, numerous pneumatically-controlled valves behind the front panel, a venturi pump, a calibrated standard volume (nominally 300 cc), numerous fittings and tees, a compressed air quick-connect fitting (panel mounted) and a ¼" VCR port (panel mounted) for connecting to the test device/manifold.

The system shown in FIG. 3 was designed to be mounted on a standard 19 inch wide rack mount panel with only two connections needed: one for compressed air and the other for the device under test. Two valves are attached to the panel comprising the top of the system housing; one valve is for starting and stopping the flow of the compressed air, and the other valve is for controlling the functions (via operating various pneumatic valves) of the PPM. The compressed air valve can be a simple on/off ball valve. The control valve can direct the flow of compressed air to one port at a time, and can vent of the rest of the ports as the valve is turned from one position to the next. The purpose of this control valve is merely to direct the flow of compressed air to the various functions under the panel. The ability to vent the line between operations is an important feature that allows the pneumatic valves to return to their normal state as the control valve is moved to the next position, which causes the operation of more valves. Two pressure gauges are mounted on the panel, one an absolute pressure gauge and the other a differential pressure gauge. The absolute pressure gauge is used to measure the pressure inside the manifold, and the differential pressure gauge is used to measure the rate of pressure rise during the diagnostic testing. Either a digital or an analog gauge can be used to read out the pressure. Digital pressure gauges use either 1.5V (for example, AA batteries) or 9V batteries, and the analog pressure gauges (e.g., dial gauges) use no batteries at all. Behind the panel, many valves exist that are connected by stainless steel tubing, which make up the manifold. A calibrated standard volume is also provided for the volume measurement procedure. The vacuum is provided by a commercially available vacuum pump, such as a venturi vacuum pump. Typically this vacuum pump will provide a low vacuum (i.e., high pressure) of 1-10 Torr. There is no preparation needed prior to using this instrument except for the occasional calibration of the standard volume and the pressure gauges.

The use of a venturi pump has several advantages, including the ability to leak test in the low vacuum regime, elimination of AC or DC power sources, elimination of the need for roughing and high-vacuum pumps, and safety. In particular, the ability to leak test in the low vacuum regime has several advantages, including that it is an easier pressure regime to leak test and gas sample in, a tracer gas is not needed, more fragile components can be tested, gas purity is maintained, and the method is fundamental and accurate.

One advantage to operation in the low vacuum regime is that it easier to leak test and to trace gas analyze in a viscous gas flow regime, due to less backstreaming and excellent electrical safety. The venturi pump has an ultimate base pressure of about 1-10 Torr (atmospheric pressure is 760 Torr), which is a relatively high pressure when compared with roughing pumps (typically $10^{-3}$ to $10^{-4}$ Torr base pressure), molecular drag pumps (typically $10^{-6}$ Torr base pressure), turbomolecular pumps (typically $10^{-9}$ Torr base pressure) and cryopumps (typically $10^{-11}$ Torr base pressure). Therefore, the venturi pump has a base pressure many orders of magnitude higher than that of other vacuum pumps commonly used. This distinction provides a number of advantages that require some understanding of gas flow dynamics and outgassing characteristics.

Typical gas flow can be grouped into three major categories: viscous, transitional, and molecular flow. At atmospheric pressure, the flow is viscous, and as the pressure drops from approximately 0.1 Torr to $10^{-4}$ Torr, the flow becomes transitional. Finally, at lower pressure (e.g., less than $10^{-5}$ Torr), the flow becomes molecular. In viscous flow, gas molecules are swept along by the other gas molecules in a flow much like water in a stream. In molecular flow, the molecules of gas bounce around in the chamber until they encounters an opening and can escape the chamber. In molecular flow, molecules are equally likely to go towards the vacuum pump as they are back into the vacuum chamber or manifold. Transitional flow is some combination of viscous and molecular flow (depending on pressure and other secondary effects like gas type, temperature, etc.). This becomes important for the venturi pump since it operates exclusively in the viscous flow regime, which means that various types of gas molecules "flow" out of the manifold during the evacuation and this outflow occurs very quickly. The benefit of this is that during typical operations of the power-free instrument, the manifold is evacuated and clean gas is introduced back to approximately atmospheric pressure. The evacuate-backfill sequence can be repeated and impurity gasses can be efficiently and quickly removed from the manifold and/or the device under test. The efficiency and cleanliness obtained may be counter-intuitive with respect to the standard practice of using a vacuum pump capable of generating a much higher vacuum (e.g., roughing pump or turbomolecular pump) to evacuate the vessel for a long period of time before beginning the test. During the standard-practice evacuation, once the pressure gets below the viscous flow regime and is in transitional or molecular flow regime, backstreaming of contaminant gases can and typically does occur. To counter this effect, longer and longer evacuation times (typically hours, days, or even weeks) are used to remove contaminants. Therefore, the viscous flow evacuate-backfill method used in the present invention is more efficient in removing contaminants in less time than the standard practice of using typical high-vacuum pumps.

Further, the impact of moisture outgassing on leak testing and trace gas sampling is virtually eliminated using a venturi pump with the evacuate-backfill method. Water and other contaminants stick to surfaces of materials in the manifold and the device under test. To reduce the moisture from stainless steel surfaces typically requires baking (e.g., to greater than 300° C.) the part under vacuum for hours or even days. These extreme conditions are necessary because water binds very strongly to many surfaces. Not all materials and components in vacuum systems or test devices can survive such an aggressive thermal cycle. The vapor pressure of water is ~20 Torr at ~22° C. (saturated water vapor in contact with liquid water), so water contamination in a vacuum system is extremely important, especially if typical vacuum pumps are used (ultimate vapor pressures are much, much less than 20 Torr). For example, since the venturi pump operates at a base pressure of ~10 Torr, the driving force for outgassing water off the walls is only a factor of two off of the pump base pressure, whereas for a turbomolecular pump, the driving force could be on the order of $10^{10}$ times the pump base pressure, so outgassing of water will very likely occur in such high vacuum systems. The net result is that during evacuation of an unbaked manifold, if isolated from the vacuum pump, the manifold pressure will be essentially stable (within the resolution of the pressure gauge) for the venturi pump since outgassing is minimal, and the manifold pressure will increase rapidly (often orders of magnitude in a matter of seconds) for a turbomolecular pump.

Another advantage of leak testing in the low vacuum pressure regime is that a tracer gas is not needed, providing simplicity and ease of use. With typical leak testing methods, measuring pressure rise is often difficult since outgassing can easily confuse the test results. Selective tracer gas methods (e.g., with helium or argon) are often used to help overcome this difficulty, but doing so typically necessitates a much more complex AC-powered leak tester with vacuum pumps, selective gas detector, etc. Small battery powered leak detectors do not have the sensitivity nor the accuracy of the power-free PPM of the present invention. With the power-free PPM, no tracer gas is used and, therefore, no extra gas cylinders, regulators, etc. are required.

Another advantage of leak testing in the low vacuum pressure regime is that the pressure range for testing is milder than hard vacuum so more fragile components can be tested. Leak testing and gas sampling can be performed at 10 Torr (and even higher pressures by procedurally terminating the evacuation at the desired pressure) so components and materials that might be damaged by exposure to high vacuum can be leak tested at much more elevated pressures.

Another advantage of leak testing in the low vacuum regime is that gas purity is maintained, enabling gas sampling. In particular, high-purity gas sampling is enabled by using the evacuate-backfill method described above. Evacuating in the viscous regime and then backfilling with the gas to be sampled, and repeating the sequence a number of times is an efficient way to fill gas sample bottles with the gas to be sampled. The number of evacuate-backfill cycles depends on the purity desired, volume of the device under test, the pressures used, etc. Five evacuate-backfill cycles are typically adequate for reducing impurities to less than parts-per-million by volume.

Finally, the method used is fundamental (standards/calibration class) and accurate. Measurements are based on the ideal gas law. Therefore, the unknown can be simply calculated based on the other known variables. In particular, calibrated leaks are not required to calibrate the system.

No power, either AC or DC, is required to operate a venturi pump. This has the advantage of not requiring battery packs and eliminates the need for a conductive power supply line, enabling use of the device in sensitive and hazardous applications and locations.

Battery packs to run DC power for other types of vacuum pumps are very bulky, heavy, hazardous, and have limited life. For example, a battery-powered miniature turbomolecular drag pump would require about two dozen D-cell batteries for a nominal run time of a few hours. This many batteries would increase the weight and size of the leak tester substantially and consume a large numbers of batteries. The amount of stored energy required for a DC-powered vacuum pump may also be hazardous and preclude use in certain applications. Larger batteries (e.g., car-type lead acid batteries coupled with a power inverter) can be used to supply power to more conventional pumps (AC-powered roughing pump, turbomolecular pumps, etc.), but such a battery would also be expensive, large, heavy, and hazardous due to stored energy, again precluding use in certain applications. The added size and weight would make battery use in portable applications difficult, and preclude use in a light-weight, compact, portable instrument.

The need for AC power also precludes the use of such leak testers in certain applications and locations. Certain applications require that power sources be minimized or even eliminated for safety reasons, safety of personnel, environment, or even other equipment. For example, leak testing a line that carries flammable liquids or gas requires the use of equipment that does not have the potential for generating a spark. Typical vacuum pumps have AC motors that are not rated for flammable or explosive environments. Examples of other applications that could benefit from the inherently safe leak detector/volume measurement instrument of the present invention include the natural gas/propane industries, petroleum industry, explosive industry, semiconductor industry (many hazardous and flammable gases are used in the production of integrated circuits), defense-related industries, automotive/agricultural industries, aerospace industry (many static sensitive components need to be protected), and many more.

One critical principle to follow for electrical safety is to minimize the potential of energy from an instrument being able to be applied to the device under test. The greater the energy, the greater the chance the energy can "jump" (i.e., arc) to the device under test. Therefore, the best way to minimize this hazard is through the minimization of the power in the tester. Another critical principle to follow for electrical safety is to consider the implications of the Paschen Curve for the conduction of electricity (e.g., arcs). The Paschen Curve provides a relationship between the gas pressure and the breakdown voltage (i.e., when the gas becomes conductive). When gas is under a partial vacuum, it can become conductive as is with fluorescent tube or neon lights which are tubes filled with gas at a low pressure such that electricity can conduct and excite the gas molecules. Typical vacuum pumps reach or pass through pressures ($10^{-8}$ to $10^{-1}$ Torr) in which gases become conductive. This hinders the use of typical roughing and turbomolecular pumps due to Paschen Curve considerations for hazardous applications.

Another advantage of not requiring either AC or DC power to operate a venturi pump is that no conductive power supply line is required. Unlike the power cords required for either AC or DC power, polymer-type compressed air lines required for a venturi pump are not electrically conductive. With an insulated compressed air line, no electrical energy is available to be transmitted to the instrument and ultimately to the device under test.

Another advantage of not requiring either AC or DC power is that the compressed air supply required for operation of the venturi pump can be remote and/or portable. Compressed air is commonly available, and if not, it can be generated easily via a compressor or compressed gas cylinder. For example, a 1 A gas cylinder has enough gas to perform multiple typical leak test and volume measurements.

Generally, other leak test devices and methods require the establishment of a vacuum level down to much less than 1 Torr. For example, typical residual gas analyzers use a roughing pump to achieve moderate vacuums in the millitorr ($10^{-3}$ Torr) regime. Such roughing pumps are positive displacement pumps that use an AC-powered mechanical motion to create a vacuum. Typical trace gas analyzers also require a second vacuum pump, such as a turbomolecular pump, to achieve a high vacuum of at least $10^{-6}$ Torr. Such turbomolecular pumps are momentum transfer pumps that use an AC-powered mechanical motion to create a vacuum.

A venturi pump has several advantages compared to a roughing pump. A venturi pump is leaner, faster, smaller, and quieter, does not require maintenance, and has no moving parts. The venturi pump is about the size of a deck of cards. Typical roughing pumps are much larger and much heavier. Further, a venturi pump has no oil to change, bearings to lubricate, parts to service (like fins in a scroll pump), heat from an electric motor, motors to burn out, electrical control circuits to get damaged with power-line voltage spikes, etc. Roughing pumps are typically AC powered, whereas a venturi pump only requires compressed air. Oil backstreaming is a problem with roughing pumps, as described above, but not a problem with venturi pumps. Overloading motor or burning of oil, which can occur when evacuating large volumes with a roughing pump, is not a problem with a venturi pump. A venturi pump can evacuate large volumes efficiently and quickly.

A venturi pump also has several advantages compared to turbomolecular and other high-vacuum pumps. A venturi pump is smaller than any turbomolecular pump capable of performing similarly to the venturi pump. Turbomolecular pumps do not operate at the higher pressures that a venturi pump does, which means that tests at the higher pressures could not practically use any high-vacuum pumps. In particular, small, battery operated turbomolecular pumps would not perform satisfactorily at the pressures desired. A venturi pump is simpler, does not require maintenance, and has no moving parts. Turbomolecular pumps have precision bearings and rotors that require servicing at regular intervals and require controllers to power the rotor and control the speed. Overpressurization can be a problem with a turbomolecular pump. If a valve to a large volume is opened suddenly (which is typical of a pneumatically-controlled valve—it is either open or closed) with a turbomolecular pump rotating at normal speed, the pump can fail catastrophically due to the sudden inrush of gas causing abnormal forces on the rotor fins. The venturi pump is inherently immune to pressure surges such as those caused by the sudden opening of a valve to a large volume. Turbomolecular pumps operate at lower pressures and in the molecular flow regime. Therefore, outgassing is a big concern, particularly water outgassing and outgassing due to oil contaminants. Turbomolecular pumps are typically AC powered, and those that use batteries are typically able to operate for only a short time, especially when exposed to a gas load (higher pressures) that are typically encountered during leak testing and volume measurement. In particular, battery-powered miniature turbomolecular pumps don't have long run times nor do they have the power to evacuate large vessels. A turbomolecular pump normally cannot operate as a stand-alone pump, but requires a roughing pump in order to operate effectively. This adds complexity, power requirements, weight, etc. At higher pressures, the turbomolecular pump becomes ineffective (it does not have enough power to turn quickly at the higher pressures) so the net evacuation power is merely the roughing pump. Finally, some molecular drag pumps that operate do without a roughing pump (e.g., blowers) require great power (typically AC), and are heavy, large, and complex compared to the venturi pump.

Another advantage of the venturi pump is safety. The AC/DC power requirements of most vacuum pumps necessitate electrically conductive lines. The compressed air/gas lines used for venturi pumps can be electrically insulating. This can be an advantage in hazardous as well as non-hazardous environments that can experience static build-up.

The present invention can use a multi-port pneumatic valve as a "pneumatic computer" to hydraulically control other pneumatic valves in the manifold. This type of valve controller has several advantages compared to other types of valve controllers.

Conventional electrically-based or electro-pneumatic controllers require AC or DC power. Typically, valve controllers are AC powered. Although complex logic valving patterns are possible with electrically-based controllers, the need for electrical power precludes this type of controller from being used in hazardous environments, as described above.

Figure 4:
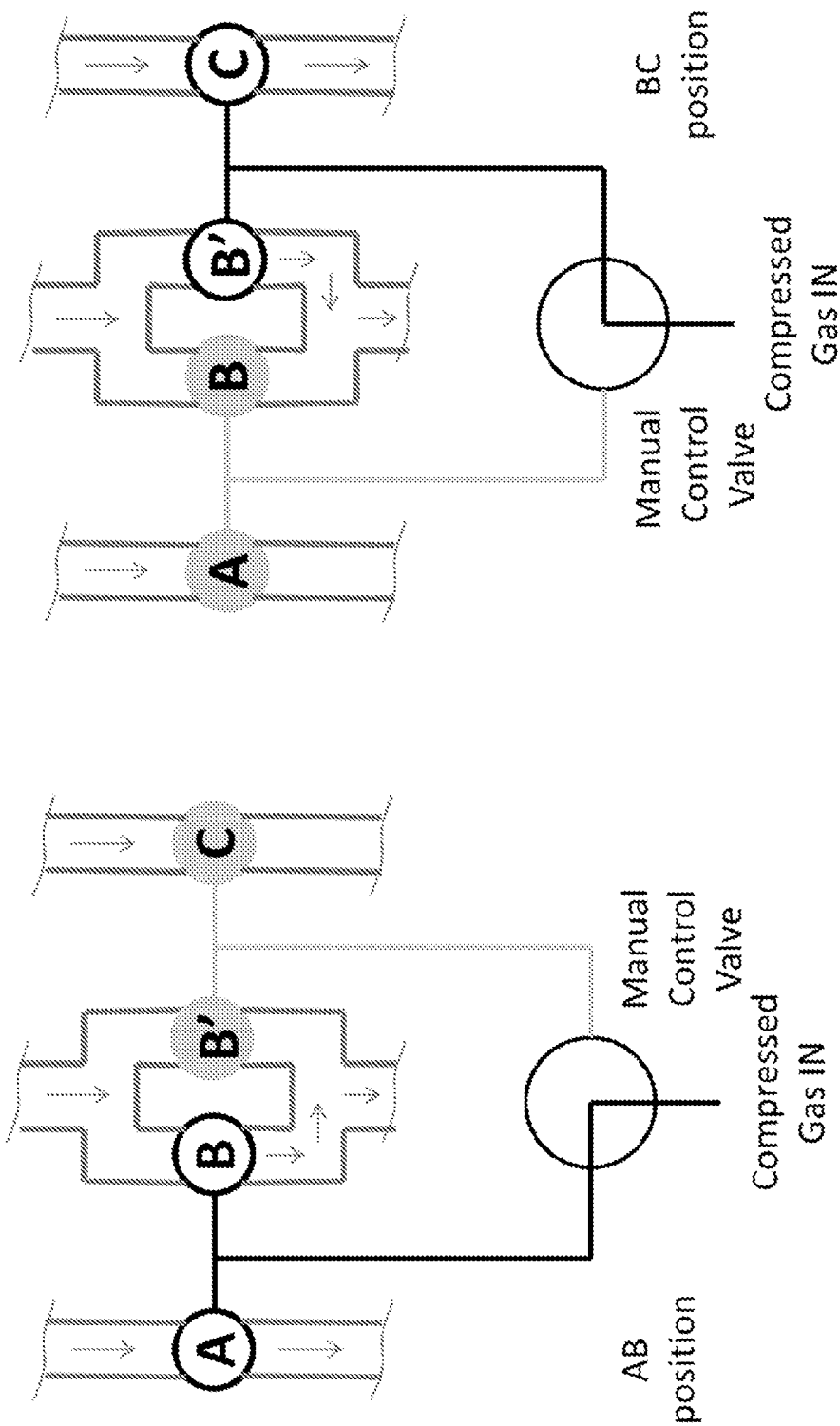
FIG. 4 is a schematic illustration of a typical pneumatic-only controller (e.g., uni-controller).

Typical pneumatic-only controllers (e.g., uni-controller) only provide basic controls—typically each valve controls whether one (or more) valve(s) is (are) on or off. These controllers use a manual valve to control the flow of compressed gas to a pneumatic valve to either open or close the valve upon the application of pressure. Then, once in the activated (or pressurized) state, the compressed gas in the line must be vented in order for the valve to return to its normal state (normally open, normally closed). This venting operation necessitates the addition of some other venting means, for example another valve, adding complexity and weight. Dedicated control lines to a valve require redundant valving. As the complexity of the logic desired increases (i.e., the pattern of activated valves in a given manifold), more valves have to be added to enable the more complex logic. This causes redundant valves to be added. In the uni-controller example shown in FIG. 4, if a pattern desired is to open valves A and B at the same time, and another pattern is to open B and C at the same time, this will necessitate adding a valve B' so that valves A and B can be controlled by the same gas flow, and B' and C can be controlled by another gas flow. Every manifold valve that is added increases the possibility of having a leaking component in the system just by the sheer number of valves along with increasing the cost, weight, installation costs (e.g., welding), etc.

Figure 5:
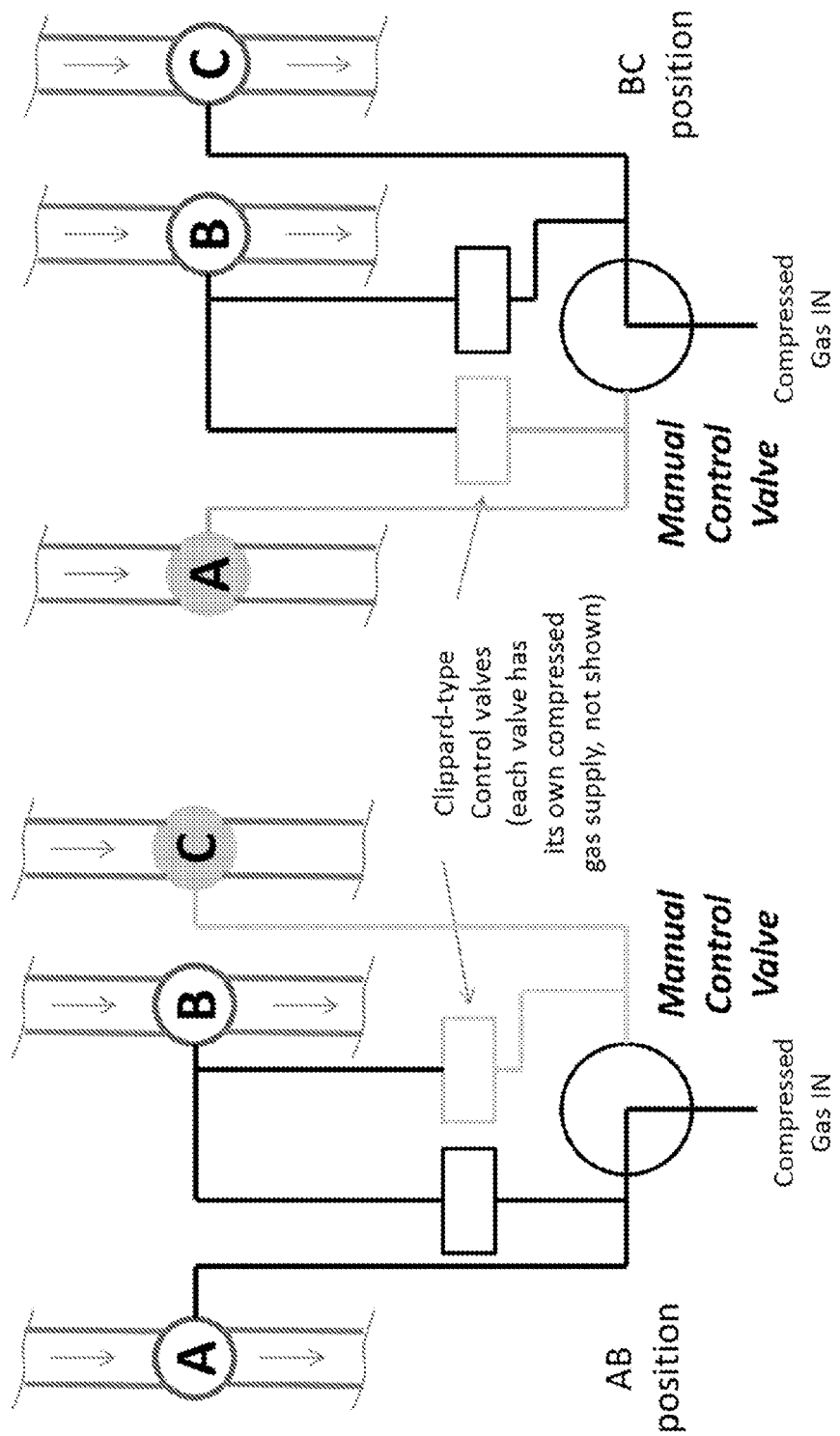
FIG. 5 is a schematic illustration of a "pneumatic computer" comprising a multi-port pneumatic control valve that enables complex operations with increased reliability.

Conversely, the pneumatic computer of the present invention requires no AC or DC power. The pneumatic computer enables multi-state valving with a single movement of a multi-port pneumatic controller valve. The pneumatic computer uses layers of control valves (for example, Clippard miniature pneumatic control valves) as a means to provide logic (e.g., binary) in the form of pneumatic tubes from a primary control valve (i.e., an instrument valve modified so it vents between positions) to ultimately control manifold valves. For example, another embodiment of the present invention that enables additional operations, such as gas sampling, moisture purging, etc. can use four layers of control valves, wherein the main control valve directs compressed gas to the first layer, then the first layer directs compressed gas to the second layer, and so on through the fourth layer, which ultimately controls the manifold valves on a power-free gas sampler so the measurements can be made. As shown in FIG. 5, one manifold valve can be eliminated through the use of the inexpensive, small Clippard-type pneumatic valves. Using this "pneumatic computer", complex logic can be formulated by linking and layering (one valve controlling the next valve (s) and so on) these valves together and many redundant manifold valves can be eliminated. Therefore, a pneumatic computer minimizes the number of control valves required, eliminates redundancies, and minimizes leakage/failure possibilities. Further, the control valves can be simple, small, inexpensive, reliable and commercially available. Conversely, typically manifold valves are larger, heavier, more expensive, and must be leak tight. Therefore, by eliminating redundancies, the size, weight, and cost of the power-free leak tester can be minimized, and the reliability increased by minimizing the chance of having a leaking valve by reducing the number of manifold valves. The pneumatic computer also enables complex operations, such as gas sampling, leak testing, and volume measurement, in the same instrument. Multiple layers of control valves directing compressed gas provides complex logic outputs such that sophisticated operations can be performed with just the movement of a manual control valve from one position to another. For example, manual control valves direct gas to Clippard-type control valves that are used to control manifold valves to provide a light-weight, portable leak tester, gas sampler, and volume measurement instrument.

EXAMPLE

Performing gas sampling and leak test operations is becoming more and more difficult as safety requirements increase due to the reluctance of having powered (e.g., AC power) testers in sensitive or hazardous applications. With the current safety rules, powered test equipment cannot be used during lightning warnings, which greatly reduces production throughput. The non-AC-powered leak tester and volume calibration system is designed to be modular and easy-to-use.

One embodiment of this invention will be described here; however, the idea can be scaled up or down as needed. The invention is designed to be mounted on a standard 19 inch wide rack mount panel with only two connections needed: one for compressed air and the other for the test device. Two valves are attached to the panel; one valve is for the compressed air ON/OFF, and the other valve is for controlling the functions (via operating various pneumatic valves) of this invention. The compressed air valve is a simple ON/OFF ball valve. The control valve is a special, modified instrument control valve that allows for the venting of the line between the port positions. The purpose of this valve is merely to direct the flow of compressed air to the various functions under the panel. The ability to vent the line between operations is a very important feature that allows the pneumatic valves to return to their normal state as the control valve is moved to the next position, which causes the operation of more valves. This control valve is the subject of another patent disclosure. Two pressure gauges are mounted on the panel, one absolute pressure gauge and the other a differential pressure gauge. The absolute pressure gauge is used to measure the pressure inside the manifold, and the differential pressure gauge is used to measure the rate of pressure rise during leak testing.

Two prototypes of this invention were made: a digital version and an analog version. Digital pressure gauges use 9V batteries, and the analog pressure gauges (e.g., dial gauges) use no batteries at all. Behind the panel, many valves exist that are connected by stainless steel tubing, which make up the manifold. A calibrated standard volume is also provided under the panel for the volume measurement procedure. The vacuum is provided by a commercially available venturi vacuum pump. Typically this vacuum pump will provide a vacuum of less than 10 Torr. There is no preparation needed prior to using this instrument except for the occasional calibration of the standard volume and the pressure gauges.

Figure 6:
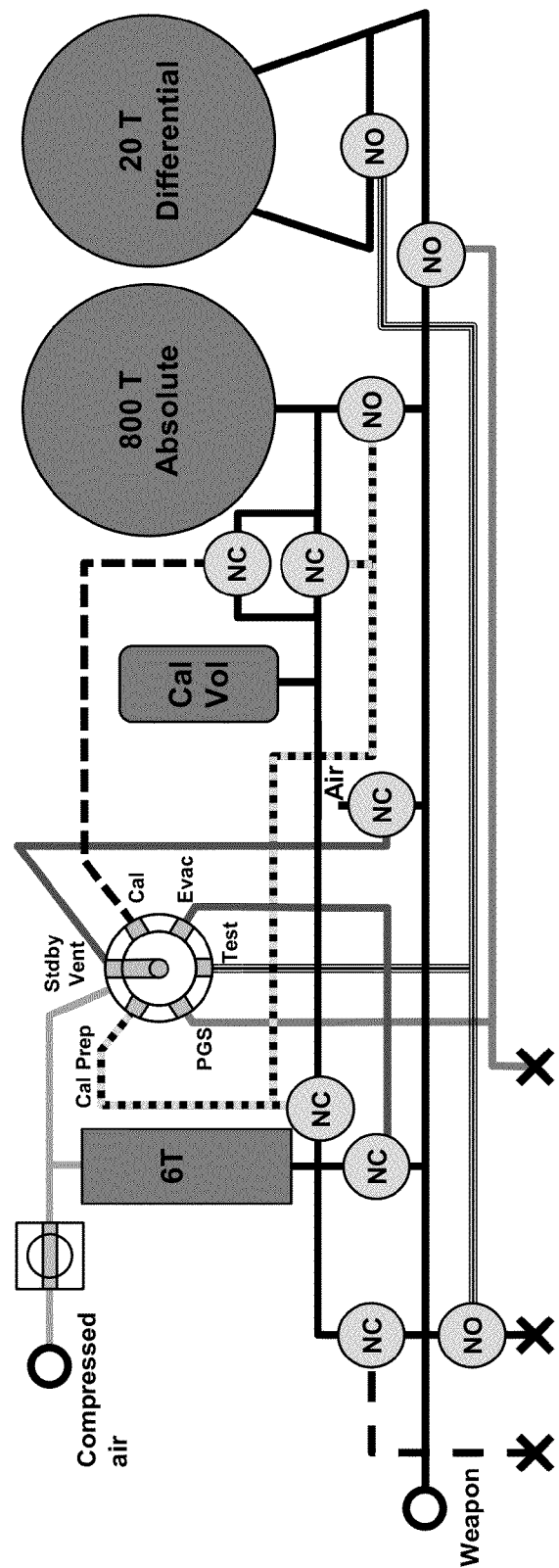
FIG. 6 is a schematic illustration of a power-free pump module (PPM).

To start, the tester is connected to the test device, and compressed air is attached (FIG. 6). The compressed air ON/OFF valve is turned ON, which supplies compressed air to the control valve and venturi vacuum pump. When the control valve is switched from the Standby position (labeled "Stdby" in FIG. 6) to the Volume Cal Prep position (labeled "Cal Prep" in FIG. 6), the calibrated volume is evacuated. The value for the base vacuum pressure is recorded, which is displayed on the absolute pressure gauge. The control valve is then turned back to the Standby position, where the test manifold is vented to room air but the calibrated volume remains under vacuum. The value for the atmospheric pressure is recorded, which is displayed on the absolute pressure gauge. By turning the control valve to the volume calibration position (labeled "Cal" in FIG. 6), a pressure drop from atmospheric pressure is recorded, which is displayed on the differential pressure gauge. By knowing the values for the vacuum pressure, atmospheric pressure, the pressure after expansion, and the calibration volume, the combined volume of the test and manifold volumes can be calculated. Next, the control valve is turned to the Evacuation position (labeled "Evac" in FIG. 6), where the manifold and the test volume are evacuated. After stabilization, the control valve is turned to the Leak Test position (labeled "Test" in FIG. 6), where the manifold is isolated from the vacuum pump and the two sides of the differential pressure gauge are isolated also. In this configuration, the pressure rise in the manifold can be observed on the differential pressure gauge. By recording the amount of pressure rise per given unit of time, and knowing the volume of the manifold and test volume, a leak rate can be calculated. The final position on the control valve is for the gas sampling unit (labeled "PGS" in FIG. 6). In this position, compressed air is directed to the gas sampling unit, which is in the prototype development stage.

The invention being thus described, it will be apparent to those skilled in the art that the same may be varied. Such variations are not to be regarded as a departure from the spirit and scope of the invention, and all such modifications are intended to be included within the scope of the following claims.

We claim:
1. A device for detection of gas leakage, comprising:
a compressed gas source;

a venturi vacuum pump;

a vacuum manifold fluidically connected separately to the compressed gas source, the venturi vacuum pump, and a device under test;

a control valve for controlling fluid flow through the manifold from the device under test to either the compressed gas source or the venturi vacuum pump;

a differential pressure gauge for measuring the pressure differential between the manifold and the device under test as a function of time;

an absolute pressure gauge for measuring the absolute pressure in the manifold; and a standard container with a known volume fluidically connected to the manifold for determining the volume of the device under test.

2. The device of claim 1, wherein the venturi vacuum pump can evacuate the manifold to an absolute pressure of less than approximately 10 Torr and greater than approximately 1 Torr.

3. The device of claim 1, wherein the control valve comprises a multi-port pneumatic valve.

4. The device of claim 1, wherein the vacuum manifold comprises multiple apertures for making fluidic connections to the compressed gas source, the venturi vacuum pump, and the device under test; and wherein each fluidic connection comprises a pneumatic valve controlled by the control valve.

5. The device of claim 1, wherein the compressed gas source comprises compressed air.

6. The device of claim 1, wherein the pressure gauge comprises a digital gauge powered by a non alternating-current power source.

7. The device of claim 1, wherein the pressure gauge comprises a non-powered analog gauge.

8. A method for detection of gas leakage, comprising:
providing a device for detection of gas leakage, the device comprising:
  a compressed gas source;
  a venturi vacuum pump;
  a vacuum manifold fluidically connected separately to the compressed gas source, the venturi vacuum pump, and a device under test;
  a control valve for controlling fluid flow through the manifold from the device under test to either the compressed gas source or the venturi vacuum pump; and
  a differential pressure gauge for measuring the pressure differential between the manifold and the device under test as a function of time, wherein the differential pressure gauge comprises two sides in which one side is fluidically connected to the manifold and the other side is fluidically connected to the device under test;
connecting the venturi vacuum pump to the device under test through the manifold with the control valve, thereby evacuating the device under test and the manifold to a low vacuum;

disconnecting the venturi vacuum pump from the manifold;

disconnecting the device under test from the manifold; and measuring the pressure differential between the manifold and the device under test with the differential pressure gauge as a function of time.

9. The method of claim 8, further comprising at least one evacuate-backfill step, each evacuate-backfill step comprising:
connecting the manifold to the compressed gas source after the step of disconnecting the venturi vacuum pump from the manifold, thereby backfilling the manifold and the device under test with compressed gas from the compressed gas source;
disconnecting the manifold from the compressed gas source;
connecting the manifold to the venturi vacuum pump, thereby evacuating the device under test and the manifold to a low vacuum; and
disconnecting the venturi vacuum pump from the manifold.

10. The method of claim 8, wherein the low vacuum is an absolute pressure of less than approximately 10 Torr and greater than approximately 1 Torr.

11. The method of claim 8, further comprising determining the absolute leak rate of the device under test from the pressure differential as a function of time and the volume of the device under test.

12. The method of claim 11, wherein the device for detection of gas leakage further comprises a standard container with a known volume fluidically connected to the manifold for determining the volume of the device under test and the method further comprises determining the volume of the device under test using the known volume of the standard container.

13. The method of claim 8, wherein the device for detection of gas leakage further comprises an absolute pressure gauge for measuring the absolute pressure of the low vacuum in the manifold.

14. The method of claim 8, wherein the control valve comprises a multi-port pneumatic valve.

15. The method of claim 8, wherein the vacuum manifold comprises multiple apertures for making fluidic connections to the compressed gas source, the venturi vacuum pump, and the device under test; and wherein each fluidic connection comprises a pneumatic valve controlled by the control valve.

16. The method of claim 8, wherein the compressed gas source comprises compressed air.

17. The method of claim 8, wherein the pressure gauge comprises a digital gauge powered by a non alternating-current power source.

18. The method of claim 8, wherein the pressure gauge comprises a non-powered analog gauge.

* * * * *